(12) United States Patent
Okada

(10) Patent No.: US 9,060,130 B2
(45) Date of Patent: Jun. 16, 2015

(54) DISPLAY CONTROL APPARATUS AND DISPLAY CONTROL METHOD, USING A FAN TO COOL AN INSIDE OF THE APPARATUS

(71) Applicant: CANON KABUSHIKI KAISHA, Tokyo (JP)

(72) Inventor: Koichi Okada, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 13/962,648

(22) Filed: Aug. 8, 2013

(65) Prior Publication Data

US 2014/0055623 A1  Feb. 27, 2014

(30) Foreign Application Priority Data

Aug. 22, 2012 (JP) ................. 2012-183598

(51) Int. Cl.
*H04N 5/225* (2006.01)
*H04N 5/232* (2006.01)
*H04N 9/04* (2006.01)

(52) U.S. Cl.
CPC .......... *H04N 5/23293* (2013.01); *H04N 5/232* (2013.01)

(58) Field of Classification Search
USPC .............................. 348/333.02, 375; 396/374
See application file for complete search history.

(56) References Cited

U.S. PATENT DOCUMENTS

| | | | | |
|---|---|---|---|---|
| 7,117,054 B2* | 10/2006 | Frankel et al. | ................... | 700/97 |
| 7,701,659 B2* | 4/2010 | Yoshida | ........................... | 360/69 |
| 2005/0030171 A1* | 2/2005 | Liu et al. | ....................... | 340/500 |
| 2008/0294296 A1* | 11/2008 | Liu et al. | ....................... | 700/300 |
| 2009/0259348 A1* | 10/2009 | Syu | ............................... | 700/300 |
| 2012/0061071 A1* | 3/2012 | Wang et al. | .................... | 165/288 |
| 2013/0107100 A1* | 5/2013 | Okada et al. | ............. | 348/333.04 |

FOREIGN PATENT DOCUMENTS

| | | | |
|---|---|---|---|
| JP | 2000-287111 A | 10/2000 | |
| JP | 2007-227347 A | 9/2007 | |

OTHER PUBLICATIONS

Japanese Office Action dated May 30, 2014 issued in corresponding Japanese Patent Application No. 2012-183598.

* cited by examiner

*Primary Examiner* — Ngoc-Yen Vu
(74) *Attorney, Agent, or Firm* — Fitzpatrick, Cella, Harper & Scinto

(57) ABSTRACT

A display control apparatus comprises an internal temperature measurement unit, a fan, a fan controller which controls to rotate the fan when the internal temperature becomes not lower than a start threshold, and to stop the fan when the internal temperature becomes lower than a stop threshold, and a display controller which controls to display first information when the internal temperature becomes not lower than a first threshold, and to display second information in place of the first information when the internal temperature becomes higher than the first threshold and not lower than a second threshold higher than the stop threshold, and control to continue display of the second information even when the internal temperature becomes lower than the second threshold, and to set the second information in a non-display state when the fan is stopped.

29 Claims, 14 Drawing Sheets

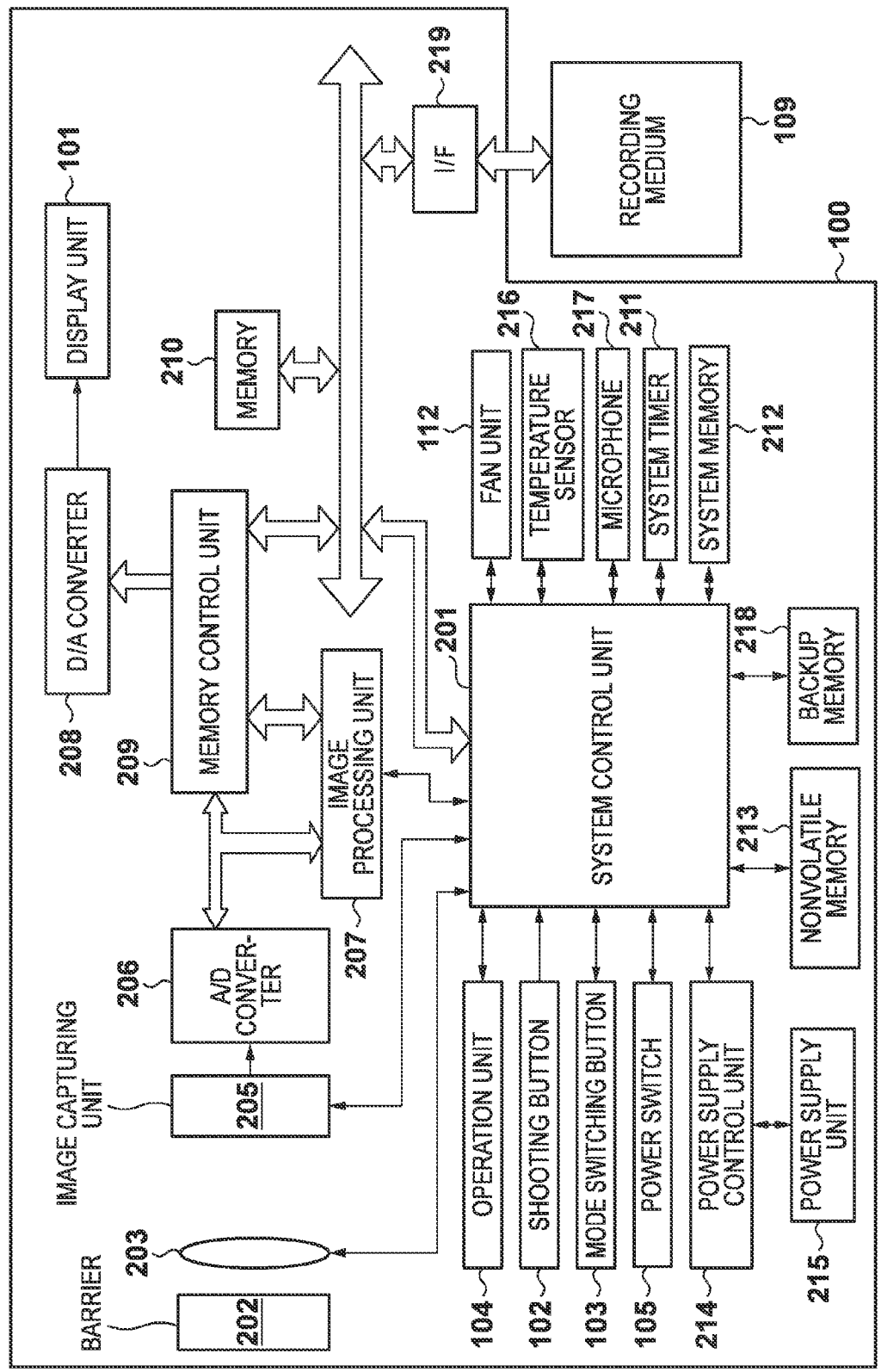

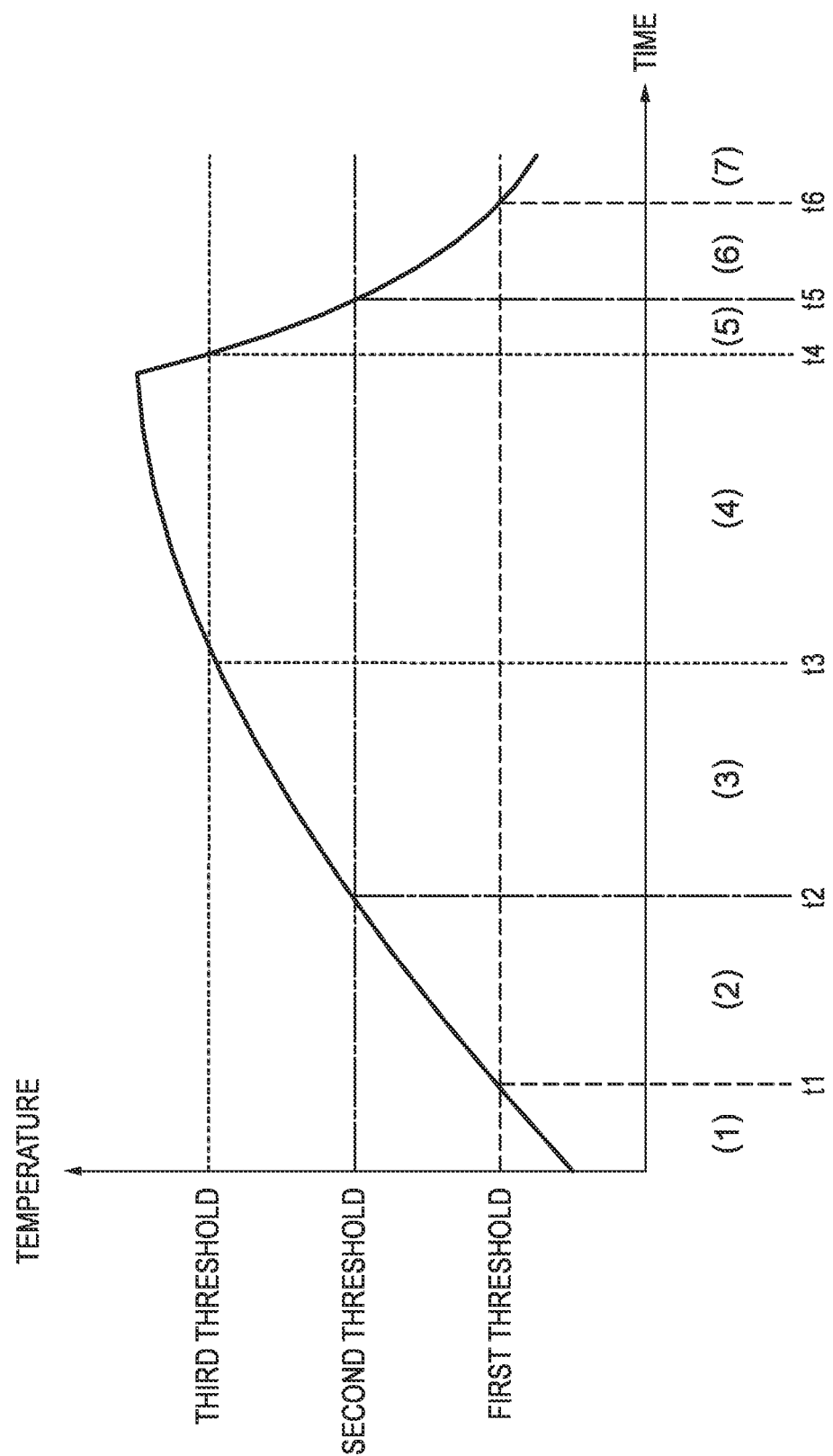

| | ICON DISPLAY | FAN OPERATION |
|---|---|---|
| ⟨1⟩ ⟨7⟩ | (NO ICON) ⇒ (NO ICON) | ROTATE ⇒ STOP |
| ⟨2⟩ ⟨6⟩ | 🌡 ⇒ 🌡 | ROTATE ⇒ STOP |
| ⟨3⟩ ⟨5⟩ | 🌡 ⇒ 🌡 | ROTATE ⇒ STOP |
| ⟨4⟩ | 🌡 ⇒ 🌡 FAN | ROTATE ⇒ ROTATE |

DISPLAY CONTROL APPARATUS AND DISPLAY CONTROL METHOD, USING A FAN TO COOL AN INSIDE OF THE APPARATUS

BACKGROUND OF THE INVENTION

1. Field of the Invention

The present invention relates to a display control apparatus and method, particularly relates to a technique of controlling display of temperature information in an apparatus including a cooling fan.

2. Description of the Related Art

In recent years, as cameras dedicated to media production represented by film shooting cameras, 35-mm film cameras have been replaced by digital video cameras (to be simply referred to as cameras hereinafter). Such cameras dedicated to media production are characterized by using a large-size CMOS sensor and processing a high-resolution video.

In such camera, the degree of integration of a circuit has increased while the camera has been downsized to reduce the cost and improve the usability, thereby causing a big problem associated with heat generation. Many cameras dissipate heat by including a fan as a measure against heat generation. However, the sound is often recorded during moving image shooting. Therefore, if the fan operates, its sound is unwantedly recorded as well.

To solve this problem, as a measure against noise, some cameras automatically control the operation of a fan based on the internal temperature of the camera or start/stop of a recording operation. Since the user of such camera may not want its fan to rotate, it is required to provide a way of notifying the user that the fan has started to rotate.

On the other hand, even if the fan is automatically controlled, it unwantedly operates under a given condition. At a shooting site where silence is of utmost importance, therefore, it is necessary to monitor the internal temperature of the camera so that the fan does not operate. As a method of monitoring the internal temperature of a camera, for example, an icon is displayed on a display device included in the camera. By switching the icon in stages according to the internal temperature of the camera, it becomes possible to use the camera while monitoring the internal temperature so that the fan does not operate. A threshold for displaying such icon should be determined based on the rising characteristic of the internal temperature of the camera or a temperature at which the operation of the camera is guaranteed such as the temperature limit of an IC as a constituent component of the camera.

Japanese Patent Laid-Open No. 2000-287111 discloses a technique in which a camera which automatically operates its fan in case where the internal temperature of the camera reaches a predetermined temperature displays an indicator before operating the fan, thereby giving the user a notice concerning the start of the fan in advance.

If the user is only given a notice in advance as in Japanese Patent Laid-Open No. 2000-287111, it is difficult for the user, who does not want the fan to operate, to manage the camera by himself/herself not to rotate the fan. It is, therefore, required to display detailed information of the internal temperature of the camera. On the other hand, since a threshold for displaying a rise in internal temperature of the camera and a threshold for controlling the rotation operation of the fan should be set to optimized temperatures, respectively, these two thresholds are probably completely different from each other. If, therefore, a rise in internal temperature is displayed independently of the operation of the fan, the user may feel that the fan operation and the display are incongruous.

SUMMARY OF THE INVENTION

The present invention has been made in consideration of the aforementioned problems, and provides a technique of enabling the user to identify the relationship between the internal temperature of an apparatus and control of a fan without confusion while keeping a threshold for notifying the user of the internal temperature of the apparatus and a threshold for controlling the fan at appropriate values.

In order to solve the aforementioned problems, the present invention provides a display control apparatus comprising: a measurement unit configured to measure an internal temperature of the apparatus; a fan configured to cool an inside of the apparatus; a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and control, while the fan rotates, to continue display of the second temperature information even where the internal temperature measured by the measurement unit becomes lower than the second threshold, and to set the second temperature information in a non-display state in case where the fan control unit stops the fan.

In order to solve the aforementioned problems, the present invention provides a display control apparatus comprising: a measurement unit configured to measure an internal temperature of the apparatus; a fan configured to cool an inside of the apparatus; a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and control to set the second temperature information in a non-display state and display fan information notifying a user of an operation of the fan in case where the internal temperature measured by the measurement unit becomes not lower than the start threshold, and not to display the first temperature information and the second temperature information regardless of the internal temperature measured by the measurement unit while the fan rotates.

In order to solve the aforementioned problems, the present invention provides a display control apparatus comprising: a measurement unit configured to measure an internal temperature of the apparatus; a fan configured to cool an inside of the apparatus; a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and control to display, together with the second temperature information, fan information notifying a user of an operation of the fan in case where the internal temperature measured by the measurement unit becomes not lower than the start threshold, and to display the fan information and set the second temperature information in a non-display state in case where the internal temperature measured by the measurement unit becomes lower than the second threshold while the fan rotates.

In order to solve the aforementioned problems, the present invention provides a display control method of an apparatus having a measurement unit configured to measure an internal temperature of the apparatus, and a fan configured to cool an inside of the apparatus, the method comprising: a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and controlling, while the fan rotates, to continue display of the second temperature information even where the internal temperature measured by the measurement unit becomes lower than the second threshold, and to set the second temperature information in a non-display state in case where the fan control unit stops the fan.

In order to solve the aforementioned problems, the present invention provides a display control method of an apparatus having a measurement unit configured to measure an internal temperature of the apparatus, and a fan configured to cool an inside of the apparatus, the method comprising: a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and controlling to set the second temperature information in a non-display state and display fan information notifying a user of an operation of the fan in case where the internal temperature measured by the measurement unit becomes not lower than the start threshold, and not to display the first temperature information and the second temperature information regardless of the internal temperature measured by the measurement unit while the fan rotates.

In order to solve the aforementioned problems, the present invention provides a display control method of an apparatus having a measurement unit configured to measure an internal temperature of the apparatus, and a fan configured to cool an inside of the apparatus, the method comprising: a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and controlling to display, together with the second temperature information, fan information notifying a user of an operation of the fan in case where the internal temperature measured by the measurement unit becomes not lower than the start threshold, and to display the fan information and set the second temperature information in a non-display state in case where the internal temperature measured by the measurement unit becomes lower than the second threshold while the fan rotates.

In order to solve the aforementioned problems, the present invention provides a display control apparatus comprising: a measurement unit configured to measure an internal temperature of the apparatus; a fan configured to cool an inside of the apparatus; a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display specific temperature information in case where the internal temperature measured by the measurement unit becomes not lower than a specific threshold, and control, while the fan rotates, to continue display of the specific temperature information even where the internal temperature measured by the measurement unit becomes lower than the threshold, and to set the specific temperature information in a non-display state in case where the fan control unit stops the fan.

In order to solve the aforementioned problems, the present invention provides a display control method of an apparatus having a measurement unit configured to measure an internal temperature of the apparatus, and a fan configured to cool an inside of the apparatus, the method comprising: a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display specific temperature information in case where the internal temperature measured by the measurement unit becomes not lower than a specific threshold, and controlling, while the fan rotates, to continue display of the specific temperature information even where the internal temperature measured by the measurement unit becomes lower than the threshold, and to set the specific temperature information in a non-display state in case where the fan is stopped in the fan control step.

In order to solve the aforementioned problems, the present invention provides a display control apparatus comprising: a measurement unit configured to measure an internal temperature of the apparatus; a fan configured to cool an inside of the apparatus; a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display specific temperature information in case where the internal temperature measured by the measurement unit becomes not lower than a specific threshold, and control to set the specific temperature information in a non-display state and display fan information notifying a user of an operation of the fan in case where the internal temperature measured by the measurement unit becomes not lower than the start threshold, and not to display the specific temperature information regardless of the internal temperature measured by the measurement unit while the fan rotates.

In order to solve the aforementioned problems, the present invention provides a display control method of an apparatus having a measurement unit configured to measure an internal temperature of the apparatus, and a fan configured to cool an inside of the apparatus, the method comprising: a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display specific temperature information in case where the internal temperature measured by the measurement unit becomes not lower than a specific threshold, and controlling to set the specific temperature information in a non-display state and display fan information notifying a user of an operation of the fan in case where the internal temperature measured by the measurement unit becomes not lower than the start threshold, and not to display the specific temperature information regardless of the internal temperature measured by the measurement unit while the fan rotates.

In order to solve the aforementioned problems, the present invention provides a display control apparatus comprising: a measurement unit configured to measure an internal temperature of the apparatus; a fan configured to cool an inside of the apparatus; a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display specific temperature information in case where the internal temperature measured by the measurement unit becomes not lower than a specific threshold, and control to display, together with the specific temperature information, fan information notifying a user of an operation of the fan in case where the internal temperature measured by the measurement unit becomes not lower than the start threshold, and to display the fan information and set the specific temperature information in a non-display state in case where the internal temperature measured by the measurement unit becomes lower than the specific threshold while the fan rotates.

In order to solve the aforementioned problems, the present invention provides a display control method of an apparatus having a measurement unit configured to measure an internal temperature of the apparatus, and a fan configured to cool an inside of the apparatus, the method comprising: a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display specific temperature information in case where the internal temperature measured by the measurement unit becomes not lower than a specific threshold, and controlling to display, together with the specific temperature information, fan information notifying a user of an operation of the fan in case where the internal temperature measured by the measurement unit becomes not lower than the start threshold, and to display the fan information and set the specific temperature information in a non-display state in case where the internal temperature measured by the measurement unit becomes lower than the specific threshold while the fan rotates.

In order to solve the aforementioned problems, the present invention provides a display control apparatus comprising: a measurement unit configured to measure an internal temperature of the apparatus; a fan configured to cool an inside of the apparatus; a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display specific temperature information in case where the internal temperature measured by the measurement unit becomes not lower than a specific threshold, and control, while the fan rotates, to display the specific temperature information regardless of the internal temperature measured by the measurement unit.

In order to solve the aforementioned problems, the present invention provides a display control method of an apparatus having a measurement unit configured to measure an internal temperature of the apparatus, and a fan configured to cool an inside of the apparatus, the method comprising: a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display specific temperature information in case where the internal temperature measured by the measurement unit becomes not lower than a specific threshold, and controlling, while the fan rotates, to display the specific temperature information regardless of the internal temperature measured by the measurement unit.

According to the present invention, the user can identify the relationship between the internal temperature of an apparatus and control of a fan without confusion while keeping a threshold for notifying the user of the internal temperature of the apparatus and a threshold for controlling the fan at appropriate values.

Further features of the present invention will become apparent from the following description of exemplary embodiments (with reference to the attached drawings).

BRIEF DESCRIPTION OF THE DRAWINGS

FIG. 2 is a block diagram showing the configuration of the digital video camera according to the embodiment;

FIG. 8 is a timing chart showing the relationship between thresholds and the internal temperature of the camera in the fan ON mode;

DESCRIPTION OF THE EMBODIMENTS

An embodiment in which display control according to the present invention is applied to an image capturing apparatus such as a digital video camera will be described in detail below with reference to the accompanying drawings.

<Apparatus Configuration>

The configuration and functions of a digital video camera of the present embodiment will be described below with reference to FIG. 1 and FIGS. 2A and 2B.

An embodiment of the present invention will now be described in detail with reference to the accompanying drawings.

Figure 1:
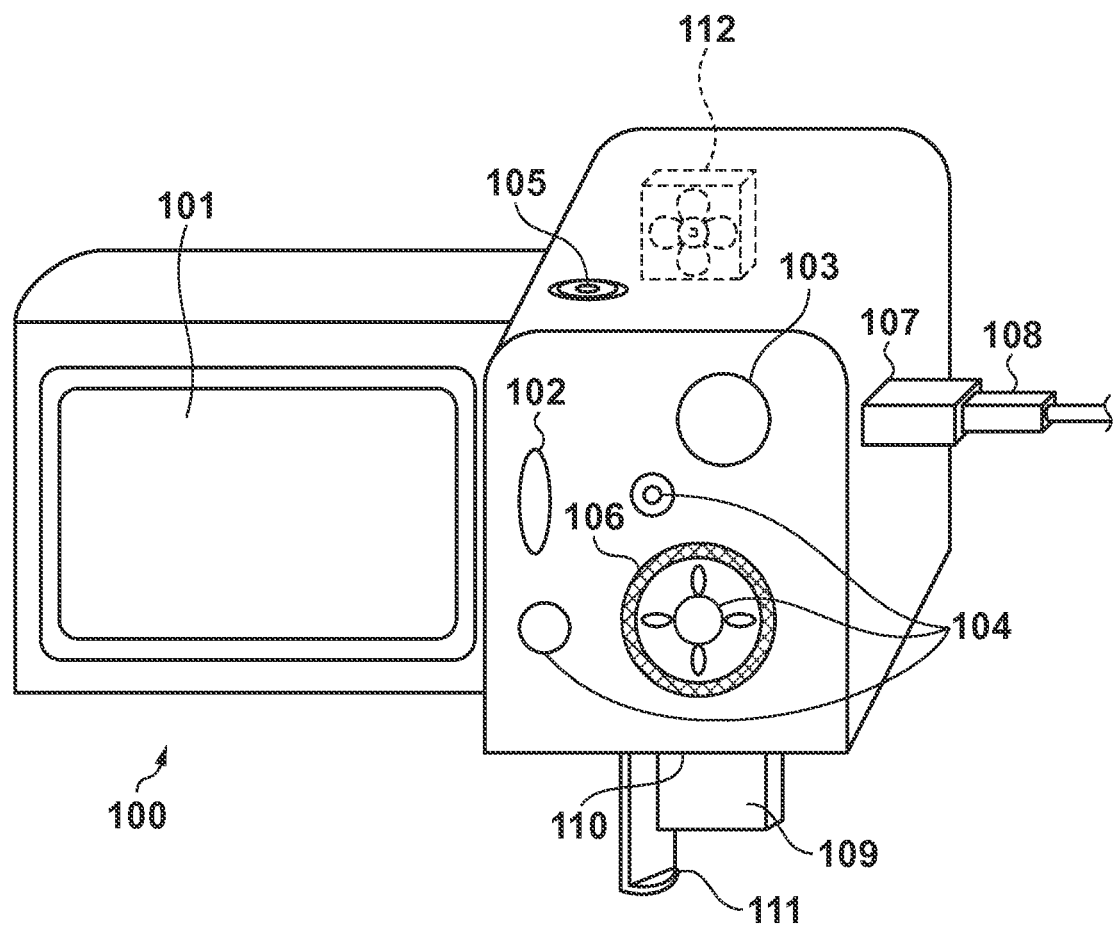
FIG. 1 is a view showing the outer appearance of a digital video camera according to an embodiment of the present invention.

FIG. 1 shows the outer appearance of a digital video camera 100 of the present embodiment. In FIG. 1, a display unit 101 displays images and various information. A shooting button 102 is an operation unit for a shooting instruction. A mode switching button 103 is an operation unit for changing over among various modes. A connector 107 connects a connection cable 108 with a digital video camera 100. Operation units 104 comprise operation members such as various switches, buttons and a touch panel operated in various ways by the user. A controller wheel 106 is a rotatable operation member included among the operation units 104. A power switch 105 switches between power on and power off. A recording medium 109 is a medium such as a memory card or hard disk. A recording medium slot 110 is for accommodating the recording medium 109. The recording medium 109 accommodated in the recording medium slot 110 makes it possible to communicate with the digital video camera 100. A cover 111 covers the recording medium slot 110. A fan unit 112 is arranged inside the digital video camera.

FIG. 2 is a block diagram exemplifying the configuration of the digital video camera 100 according to this embodiment. In FIG. 2, a photographing lens 203 includes a zoom lens and a focusing lens. An image capturing unit 205 is an image sensor, which is constituted by a CCD or CMOS or the like, for converting the optical image of a subject to an electric signal. An A/D converter 206 converts an analog signal, which is output from the image capturing unit 205, to a digital signal. A barrier 202 covers the image capturing system (which includes the photographing lens 203) of the digital camera 100, thereby preventing contamination of and damage to the image capturing system that includes the photographing lens 203 and image capturing unit 205.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using the captured image data, and the system control unit 201 performs exposure control and distance measuring control based on the calculation results. Furthermore, the image processing unit 207 performs predetermined calculation processing using the captured image data, and AWB (Automatic White Balance) processing of TTL type is performed on the basis of the calculation results.

The data from the A/D converter 206 is directly written into a memory 210 via both the image processing unit 207 and the memory control unit 209 or via the memory control unit 209. The memory 210 stores the image data obtained from the image capturing unit 205 and the A/D converter 206, and image display data to be displayed on the display unit 101. The memory 210 has a storage capacity that is sufficient for storing a predetermined number of still images as well as moving images and audio for a predetermined time period.

The memory 210 also functions as a memory for image display (video memory). A D/A converter 208 converts the image display data stored in the memory 210 into an analog signal and applies the display unit 101 with the analog signal. The image display data that was written into the memory 210 is displayed by the display unit 101 via the D/A converter 208. The display unit 101 performs, on a display device such as an LCD, display in accordance with the analog signal from the D/A converter 208. In this manner, the digital signals once converted by the A/D converter 206 and stored in the memory 210 are converted into analog signals by the D/A converter 208, and the analog signals are successively transmitted to the display unit 101 so as to be displayed thereon, making it possible to realize an electronic view finder (EVF) functionality and to perform through-the lens-image display (live view display).

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later. In the nonvolatile memory 213, threshold information as a reference for displaying an icon etc. on the display unit 101 based on temperature information obtained by a temperature sensor 213, which is described later, is stored. The system control unit 201 determines to display the icon. A backup memory 218 is, for example, an EEPROM or SRAM, which is electrically erasable and recordable. In the backup memory 218, user setting information etc. is stored.

The system control unit 201 is a calculation processing device for overall controlling the entire digital video camera 100, and realizes, by executing the programs stored in the nonvolatile memory 213, the procedures of the flowchart that will be described later. The system memory 212 is, for example, a RAM and used also as a work memory where constants and variables for operating the system control unit 201, and the programs read out from the nonvolatile memory 213 are developed. The system control unit 201 controls the memory 210, the D/A converter 208, the display unit 101, and the like, so as to perform display control.

A system timer 211 is a timer circuit for measuring time periods for various types of controls and the time of an integrated clock.

A shooting button 102, a mode switching button 103, and operation units 104 are operation members for inputting various types of instructions into the system control unit 201.

The mode switching button 103 switches the operation mode of the system control unit 201 to any of a still image shooting mode, a moving image shooting mode, and a reproduction mode. The still image shooting mode includes an automatic shooting mode, an automatic scene determination mode, a manual mode, various types of scene modes in which different settings are configured for individual shooting scenes, a program AE mode, a custom mode, and the like. Using the mode switching button 103, the mode is directly switched to any of the plurality of modes included in the still image shooting mode. Alternatively, it is also possible to switch, using the mode switching button 103, to the still image shooting mode and then to switch, using another operation member, to any of the plurality of modes included in the still image shooting mode. Similarly, also the moving image shooting mode may include a plurality of modes.

Upon triggering the operation of the shooting button 102, the system control unit 201 starts a series of operations from reading out the signal from the image capturing unit 205 to writing of image data to the recording medium 109.

By selecting various functional icons displayed on the display unit 101, appropriate functions for each situation are assigned to the operation units 104, and the operation units 104 thus act as various function buttons. Examples of these function buttons include an end button, a back button, an image scrolling button, a jump button, a narrow-down button, an attribute change button, a shortcut button. For example, a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

The controller wheel 106, which is a rotatable operation member included among the operation units 104, is used together with the direction buttons as when a selection item is specified. When the controller wheel 106 is turned, an electrical pulse signal is generated in accordance with the amount of rotation, and the system control unit 201 controls each unit of the digital video camera 100 based upon the pulse signal. The angle through which the controller wheel 106 has been turned and how many times it has been turned can be determined by the pulse signal. It should be noted that the controller wheel 106 can be any operation member so long as it is an operation member whose rotation can be detected. For example, it can be a dial operation member in which the controller wheel 106 per se is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power supply control unit 214 is constituted by, for example, a battery detection circuit, a DC-DC converter, a switch circuit for changing over the block to be supplied with power, and detects a battery has been inserted or not, the type of the battery, and the residual capacity thereof. Further, the power supply control unit 214 controls the DC-DC converter in accordance with the detection results and an instruction of the system control unit 201, and supplies a necessary voltage for a necessary length of time to each of the units including the recording medium 109.

A power supply unit 215 comprises a primary battery such as an alkaline battery or a lithium battery, a secondary battery such as an NiCd battery, an NiMH battery, or an Li battery, or an AC adaptor. The recording medium interface (I/F) 219 is for interfacing with the recording medium 109 such as the memory card or hard disk. The recording medium 109 is a recording medium such as a memory card for recording shot images, and constituted by a semiconductor memory, a magnetic disk, or the like.

The fan unit 112 serves as a cooling mechanism for suppressing a rise in internal temperature of the camera body by heat generation inside the digital video camera, and its rotation is controlled by the system control unit 201.

The temperature sensor 216 is a temperature detection unit for measuring the internal temperature of the camera body, especially the temperature of a block, the temperature of which is estimated to become high. A thermistor or the like is used as the temperature sensor 216.

A microphone 217 is used to convert the sound into an electric signal and record it when shooting a moving image or executing a voice recorder function.

<Examples of Display> Examples of display in the digital video camera according to this embodiment will be described with reference to FIGS. 3A to 3E.

The digital video camera according to this embodiment has a fan ON mode in which the fan always rotates and a fan AUTO mode in which rotation of the fan is automatically controlled based on the internal temperature of the camera. The user can select and set one of these modes.

In this embodiment, in the fan AUTO mode, fan information representing an operation state upon start/stop of the operation of the fan is displayed on the display unit 101 together with a first or second temperature warning icon representing temperature information.

In this embodiment, first, second, and third thresholds used as a start threshold for starting rotation of the fan and a stop threshold for stopping the fan are stored in the nonvolatile memory 213. The thresholds have a relationship: first threshold<second threshold<third threshold.

The system control unit 201 compares the internal temperature of the camera with each threshold. The system control unit 201 controls to rotate the fan when the internal temperature of the camera becomes equal to or higher than the start threshold, and to stop the fan when the internal temperature of the camera becomes lower than the stop threshold lower than the start threshold while the fan rotates.

Figure 3A:
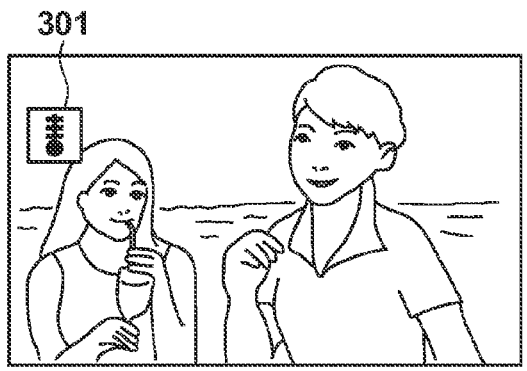
FIGS. 3A to 3E are views each showing an example of display of icons according to the first embodiment.
Figure 3B:
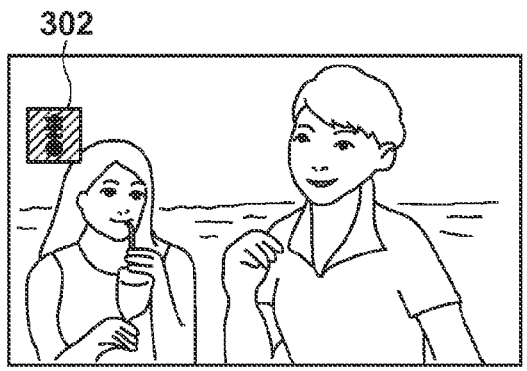
Figure 3C:
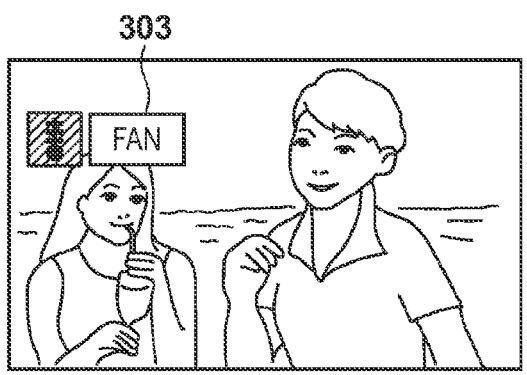

Each of FIGS. 3A to 3C shows an example of display of a temperature warning icon for notifying the user of the internal temperature of the camera and a fan icon for notifying the user of the operation of the fan on the display unit 101. Note that each of FIGS. 3A to 3E exemplifies a state in which a shot image (moving image) is displayed on the display unit 101.

An example of display in the fan AUTO mode will be described first.

If the internal temperature of the camera is lower than the first threshold, the fan does not rotate, and neither the temperature warning icon nor the fan icon is displayed (not shown).

If the internal temperature of the camera becomes equal to or higher than the first threshold, a first temperature warning icon 301 is displayed as shown in FIG. 3A while the internal temperature is lower than the second threshold. The first temperature warning icon 301 is, for example, a yellow icon, and represents first temperature information for warning that the internal temperature of the camera is rising although the operation of the camera is not adversely influenced so much. At this time, the fan does not rotate yet.

If the internal temperature of the camera further rises, and becomes equal to or higher than the second threshold, a second temperature warning icon 302 is displayed in place of the first temperature warning icon 301 as shown in FIG. 3B while the internal temperature is lower than the third threshold. The second temperature warning icon 302 is, for example, a red icon, and represents second temperature information for warning that the internal temperature of the camera is further rising and is about to reach a temperature at which the operation of the camera can be adversely influenced. At this time as well, the fan does not rotate yet.

If the internal temperature of the camera further rises, and becomes equal to or higher than the third threshold, the system control unit 201 starts to rotate the fan to lower the internal temperature of the camera, and also displays a fan icon 303 indicating that the fan is rotating, as shown in FIG. 3C. While the fan rotates, the internal temperature of the camera normally, gradually lowers. Even if the internal temperature of the camera lowers below the third threshold, the fan keeps rotating, and the second temperature warning icon 302 and fan icon 303 continue to be displayed (the display state shown in FIG. 3C continues). Even if the internal temperature of the camera further lowers below the second threshold, the fan keeps rotating, and the second temperature warning icon 302 and fan icon 303 continue to be displayed (the display state shown in FIG. 3C continues). If the internal temperature of the camera further lowers below the first threshold, the system control unit 201 stops the rotation of the fan, and the second temperature warning icon 302 and fan icon 303 are removed (set in a non-display state).

As described above, in the fan AUTO mode, when the internal temperature of the camera falls within the range from the first threshold (inclusive) to the second threshold (exclusive), displayed icons are different between a case in which the fan does not rotate and a case in which the fan is rotating after the internal temperature of the camera becomes equal to or higher than the third threshold.

An example of display in the fan ON mode will be described next. In the fan ON mode, the fan always rotates regardless of the internal temperature of the camera.

If the internal temperature of the camera is lower than the first threshold, neither the temperature warning icon nor the fan icon is displayed (not shown). At this time, the fan is rotating but no fan icon 303 is displayed.

If the internal temperature of the camera rises, and becomes equal to or higher than the first threshold, the first temperature warning icon 301 is displayed as shown in FIG. 3A while the internal temperature is lower than the second threshold. At this time, the fan is rotating but no fan icon 303 is displayed.

If the internal temperature of the camera further rises, and becomes equal to or higher than the second threshold, the second temperature warning icon 302 is displayed in place of the first temperature warning icon 301, as shown in FIG. 3B. Even if the internal temperature of the camera further rises, and becomes equal to or higher than the third threshold, the second temperature warning icon 302 continues to be displayed and no fan icon 303 is displayed.

If the internal temperature of the camera lowers below the second threshold from a temperature equal to or higher than the second threshold, the first temperature warning icon 301 is displayed in place of the second temperature warning icon 302, as shown in FIG. 3A. If the internal temperature of the camera further lowers below the first threshold, the first temperature warning icon 301 is removed (set in a non-display state).

As described above, in the fan ON mode, while the internal temperature of the camera falls within the range from the first threshold (inclusive) to the second threshold (exclusive), the icon shown in FIG. 3B is always displayed.

Various processes for performing the above-described icon display control and fan control will be described in detail below. Note that each flowchart to be described below is implemented when the system control unit 201 (more specifically, a CPU) expands a program recorded in the nonvolatile memory 213 on the system memory 212, and executes it.

Figure 4:
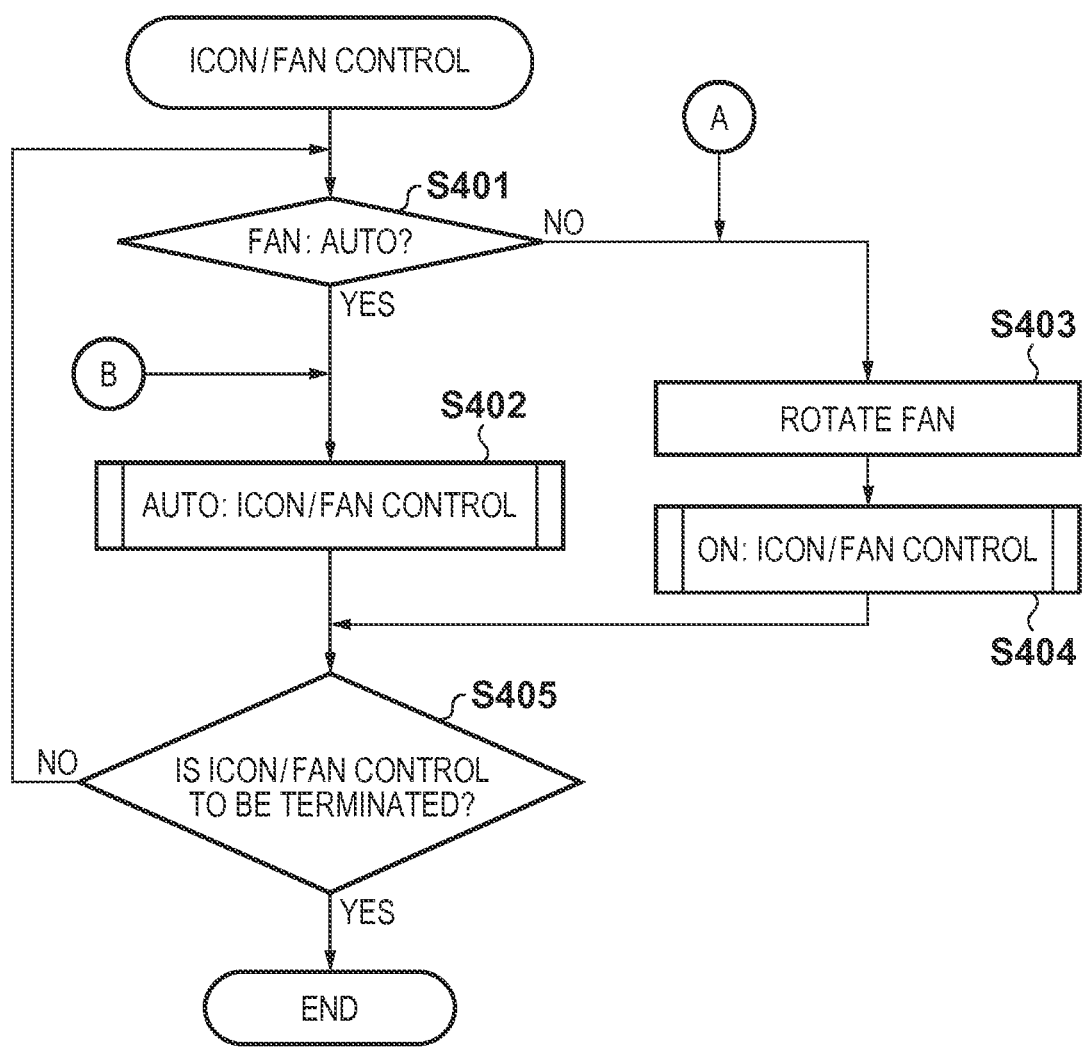
FIG. 4 is a flowchart illustrating icon/fan control according to the first embodiment.

FIG. 4 is a flowchart illustrating icon/fan control according to the first embodiment.

Upon power-on of the digital video camera, the system control unit 201 starts processing shown in FIG. 4.

In step S401, the system control unit 201 refers to the nonvolatile memory 213 to determine whether the current fan operation mode is the fan AUTO mode. If the current fan operation mode is the fan AUTO mode, the process advances to step S402; otherwise, that is, if the current fan operation mode is the fan ON mode, the process advances to step S403.

In step S402, the system control unit 201 performs icon/fan control in the fan AUTO mode. Details of icon/fan control in the fan AUTO mode will be described later with reference to FIG. 5.

On the other hand, if the current fan operation mode is the fan ON mode, the system control unit 201 rotates the fan in step S403. In step S404, the system control unit 201 performs icon/fan control in the fan ON mode. Details of icon/fan control in the fan ON mode will be described later with reference to FIG. 6.

In step S405, the system control unit 201 determines whether an event to terminate icon/fan control has occurred. An example of the event to terminate icon/fan control is an operation of turning off the power of the digital video camera. If it is determined that no termination event has occurred, the process returns to step S401 to repeat the process. If a termination event has occurred, icon/fan control is terminated.

Figure 5:
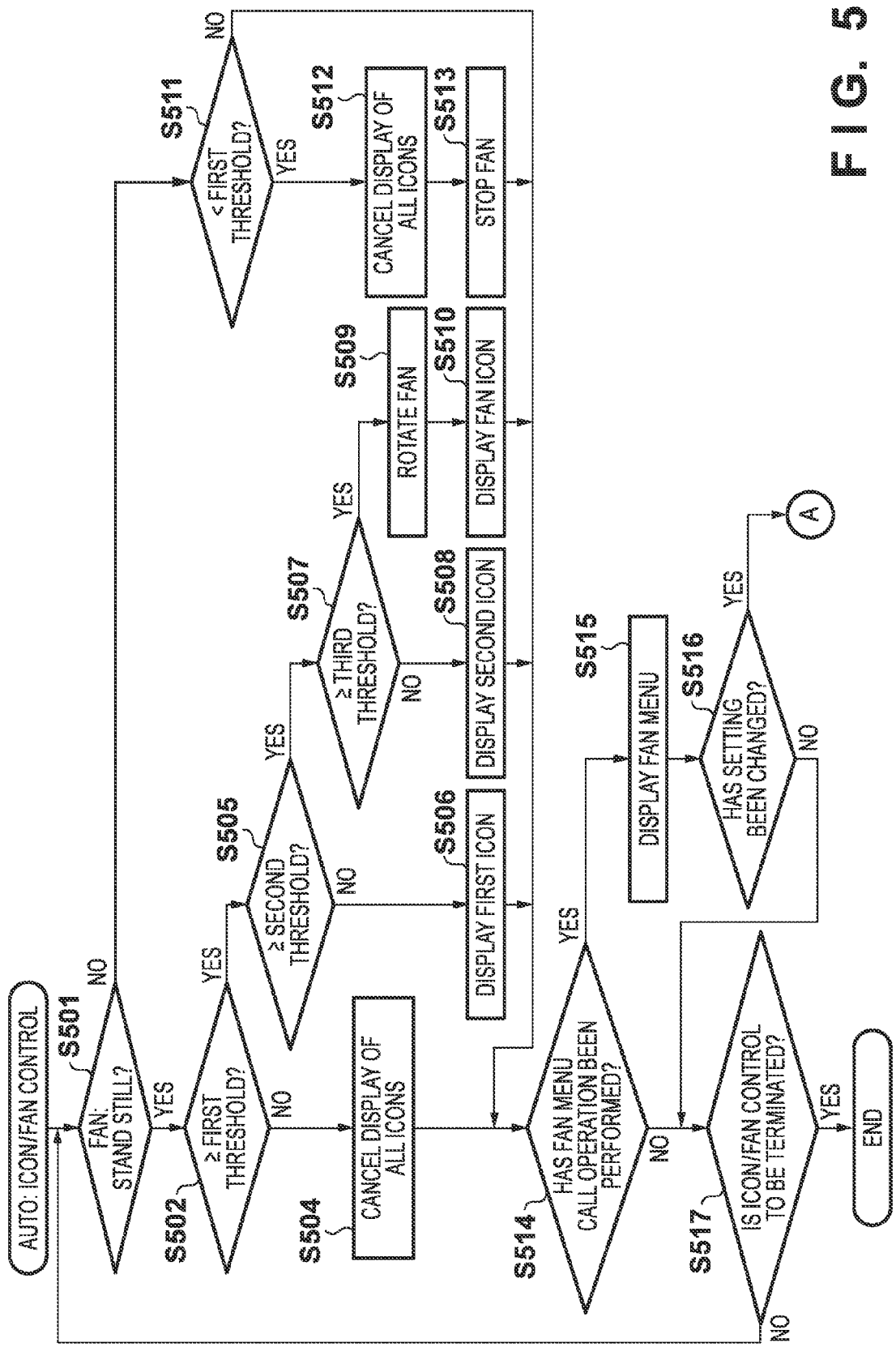
FIG. 5 is a flowchart illustrating icon/fan control in a fan AUTO mode according to the first embodiment.

FIG. 5 shows icon/fan control in the fan AUTO mode. This processing corresponds to details of the aforementioned processing in step S402 of FIG. 4.

In step S501, the system control unit 201 determines whether the fan stands still. If the fan stands still, the process advances to step S502; otherwise (if the fan is rotating), the process advances to step S511.

In step S502, the system control unit 201 obtains the current internal temperature of the camera from the temperature sensor 216, and determines whether the obtained internal temperature is equal to or higher than the first threshold. If the obtained internal temperature is lower than the first threshold, the process advances to step S504; otherwise, the process advances to step S505.

If the temperature warning icon and fan icon are displayed, the system control unit 201 cancels display of all the icons (sets the icons in a non-display state) in step S504. If no icons are displayed, no special operation is done.

If the internal temperature of the camera is equal to or higher than the first threshold, in step S505 the system control unit 201 obtains the current internal temperature of the camera from the temperature sensor 216, and determines whether the obtained internal temperature is equal to or higher than the second threshold. If the obtained internal temperature is lower than the second threshold, the process advances to step S506; otherwise, the process advances to step S507.

In step S506, the system control unit 201 displays the first temperature warning icon 301 on the display unit 101. If an image being shot is displayed, the icon 301 is superimposed and displayed on the shot image. As a result, the aforementioned display state shown in FIG. 3A is obtained.

If the internal temperature of the camera is equal to or higher than the second threshold, in step S507 the system control unit 201 obtains the current internal temperature of the camera from the temperature sensor 216, and determines whether the obtained internal temperature is equal to or higher than the third threshold. If the obtained internal temperature is equal to or higher than the third threshold, the process advances to step S509; otherwise, the process advances to step S508.

In step S508, the system control unit 201 displays the second temperature warning icon 302 on the display unit 101. If an image being shot is displayed, the icon 302 is superimposed and displayed on the shot image. If the first temperature warning icon 301 was displayed so far, the second temperature warning icon 302 is displayed in place of the first temperature warning icon 301. As a result, the aforementioned display state shown in FIG. 3B is obtained.

If the internal temperature of the camera is equal to or higher than the third threshold, the system control unit 201 rotates the fan in step S509. Note that to notify the user that the fan automatically starts to rotate, a message shown in FIG. 7B may be displayed for a predetermined period of time (about several sec). In step S510, the fan icon 303 is displayed on the display unit 101. As a result, the aforementioned display state shown in FIG. 3C is obtained.

On the other hand, in step S511 (while the fan rotates), the system control unit 201 obtains the current internal temperature of the camera from the temperature sensor 216, and determines whether the obtained internal temperature is lower than the first threshold. If the obtained internal temperature is lower than the first threshold, the process advances to step S512; otherwise, the process advances to step S514.

In step S512, the system control unit 201 removes the displayed second temperature warning icon 302 and fan icon 303 (cancels display of all the icons). In step S513, the system control unit 201 stops the rotating fan. Note that although the first threshold is used as a stop threshold temperature for stopping the fan, any temperature lower than the second threshold may be used. Setting the stop threshold temperature for stopping the fan to a temperature lower than the second threshold can prevent frequent switching between stop and rotation of the fan such that the temperature starts to rise again after stopping the fan and then exceeds the third threshold soon to start rotation of the fan.

In step S514, the system control unit 201 determines whether a fan menu call operation has been performed. As an example of the fan menu call operation, the user presses the menu button included in the operation units 104 to select a fan setting menu. If the fan menu call operation has been performed, the process advances to step S515; otherwise, the process advances to step S517.

Figure 7A:
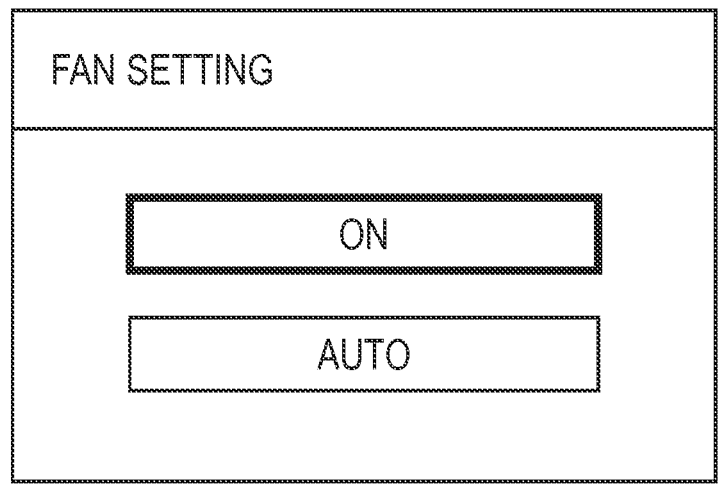
FIG. 7A is a view showing a fan operation mode setting screen.

In step S515, the system control unit 201 displays the fan menu on the display unit 101. FIG. 7A shows an example of display of the fan menu. The fan menu displays an option to set the fan ON mode and an option to set the fan AUTO mode. The user can operate the up and down buttons included in the operation units 104 to select an arbitrary option, and press the SET button, thereby setting a desired fan operation mode.

Figure 7B:
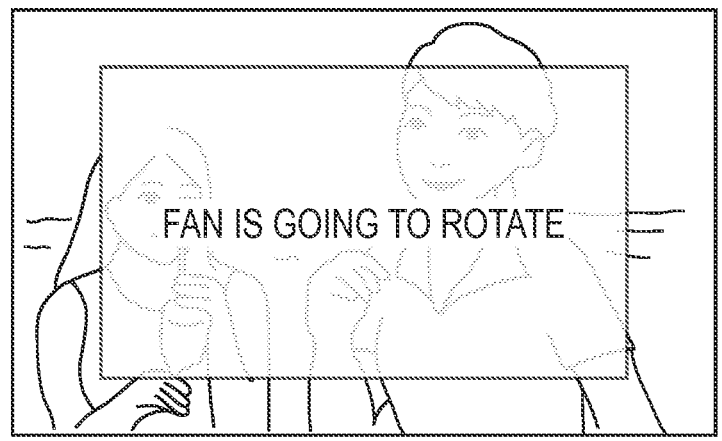
FIG. 7B is a view showing an example of display of a message about a fan operation mode.

In step S516, the system control unit 201 determines whether the currently set fan operation mode (that is, the fan AUTO mode) has been changed through the fan menu. If the fan operation mode has not been changed, the process advances to step S517. On the other hand, if the fan operation mode has been changed (that is, the fan operation mode has been switched to the fan ON mode), the process advances to step S403 of FIG. 4 to rotate the fan, and icon/fan control in the fan ON mode is then performed. Note that if the process advances to step S403 to rotate the fan from a state in which the fan stands still, a message may be displayed to notify the user that the fan is going to rotate, as shown in FIG. 7B.

In step S517, the system control unit 201 determines whether an event to terminate icon/fan control has occurred. An example of the event to terminate icon/fan control is an operation of turning off the power of the digital camera. If it is determined that no termination event has occurred, the process returns to step S501 to repeat the process. If a termination event has occurred, icon/fan control in the fan AUTO mode is terminated.

Figure 6:
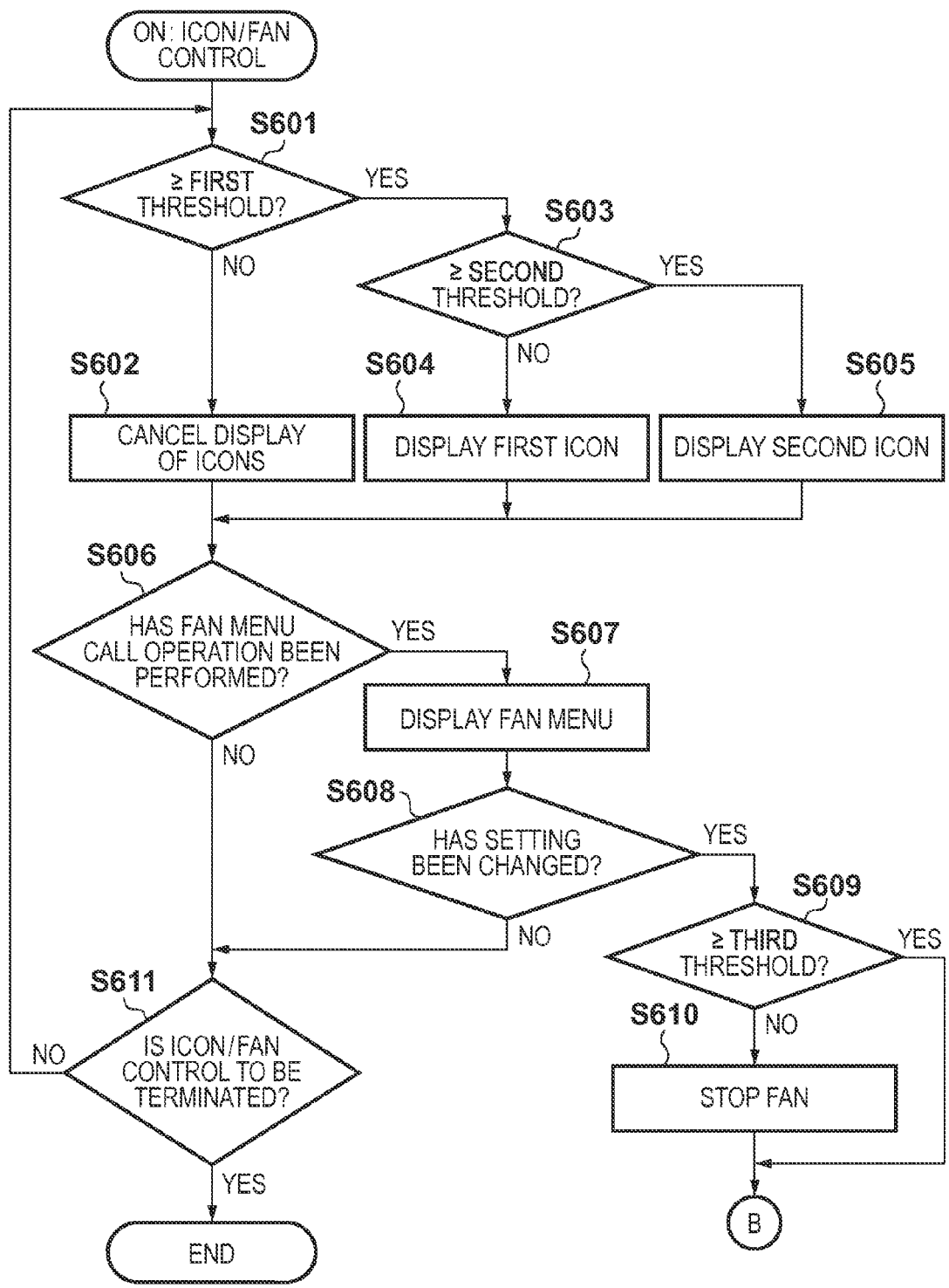
FIG. 6 is a flowchart illustrating icon/fan control in a fan ON mode according to the first embodiment.

FIG. 6 shows icon/fan control in the fan ON mode. This processing corresponds to details of the aforementioned processing in step S404 of FIG. 4.

In step S601, the system control unit 201 obtains the current internal temperature of the camera from the temperature sensor 216, and determines whether the obtained internal temperature is equal to or higher than the first threshold. If the obtained internal temperature is lower than the first threshold, the process advances to step S602; otherwise, the process advances to step S603.

If the temperature warning icon and fan icon are displayed, the system control unit 201 cancels display of all the icons (sets the icons in a non-display state) in step S602. If no icons are displayed, no special operation is done.

In step S603, the system control unit 201 obtains the current internal temperature of the camera from the temperature sensor 216, and determines whether the obtained internal temperature is equal to or higher than the second threshold. If the obtained internal temperature is lower than the second threshold, the process advances to step S604; otherwise, the process advances to step S605.

In step S604, the system control unit 201 displays the first temperature warning icon 301 on the display unit 101. If an image being shot is displayed, the icon 301 is superimposed and displayed on the shot image. As a result, the aforementioned display state shown in FIG. 3A is obtained.

In step S605, the system control unit 201 displays the second temperature warning icon 302 on the display unit 101. If an image being shot is displayed, the icon 302 is superimposed and displayed on the shot image. If the first temperature warning icon 301 was displayed so far, the second temperature warning icon 302 is displayed in place of the first temperature warning icon 301. As a result, the aforementioned display state shown in FIG. 3B is obtained.

In step S606, the system control unit 201 determines whether a fan menu call operation has been performed. This processing is the same as the above-described one in step S514 of FIG. 5. If the fan menu call operation has been performed, the process advances to step S607; otherwise, the process advances to step S611.

In step S607, the system control unit 201 displays the fan menu on the display unit 101. This processing is the same as the above-described one in step S515 of FIG. 5.

In step S608, the system control unit 201 determines whether the currently set fan operation mode (that is, the fan ON mode) has been changed through the fan menu. If it is determined that the fan operation mode has not been changed, the process advances to step S611. On the other hand, if it is determined that the fan operation mode has been changed (that is, the fan operation mode has been set to the fan AUTO mode), the process advances to step S609.

In step S609, the system control unit 201 obtains the current internal temperature of the camera from the temperature sensor 216, and determines whether the obtained internal temperature is equal to or higher than the third threshold. If the obtained internal temperature is equal to or higher than the third threshold, the process advances to step S402 of FIG. 4 described above to perform icon/fan control in the fan AUTO mode while the fan keeps rotating. On the other hand, if the obtained internal temperature is lower than the third threshold, the process advances to step S610 to stop the fan, and then advances to step S402 of FIG. 4 described above to perform icon/fan control in the fan AUTO mode.

In step S611, the system control unit 201 determines whether an event to terminate icon/fan control has occurred. An example of the event to terminate icon/fan control is an operation of turning off the power of the digital video camera. If it is determined that no termination event has occurred, the process returns to step S601 to repeat the process. If it is determined that a termination event has occurred, icon/fan control in the fan ON mode is terminated.

FIG. 8 is a timing chart showing variations in temperature in the fan AUTO mode. The ordinate represents the internal temperature of the camera, and the abscissa represents the elapsed time.

According to the aforementioned icon/fan control shown in FIG. 5, during a period (1) before a time t1, neither the temperature warning icon nor the fan icon is displayed. During a period (2) from the time t1 to a time t2, the internal temperature of the camera falls within the range from the first threshold (inclusive) to the second threshold (exclusive), and thus the first temperature warning icon 301 is displayed as shown in FIG. 3A. During a period (3) from the time t2 to a time t3, the internal temperature of the camera falls within the range from the second threshold (inclusive) to the third threshold (exclusive), and thus the second temperature warning icon 302 is displayed as shown in FIG. 3B. During a period (1) to (3), the fan does not rotate.

After the time t3, since the internal temperature of the camera is equal to or higher than the third threshold, the fan starts to rotate, and the fan icon 303 is displayed as shown in FIG. 3C. Since the fan starts to rotate, the internal temperature of the camera normally starts to lower at a time t4. After that, the fan rotates until the internal temperature of the camera becomes lower than the first threshold, that is, during a period (4) to (6), and the second temperature warning icon 302 and fan icon 303 continues to be displayed. When the internal temperature of the camera becomes lower than the first threshold at a time t6, the fan is stopped, and the second temperature warning icon 302 and fan icon 303 are removed.

Figure 9:
FIG. 9 is a table showing the relationship between icon display and a fan operation in the fan ON mode.

FIG. 9 shows the relationship between icon display and a fan operation when the fan operation mode is switched from the fan AUTO mode to the fan ON mode during each period of FIG. 8.

If the user switches the fan operation mode from the fan AUTO mode to the fan ON mode during the period (1) of FIG. 8, the system control unit 201 keeps the icons in the non-display state but the fan starts to rotate because the mode has been switched to the fan ON mode. This operation is also performed during a period (7). Similarly, during the period (2), the icon display state in which the first temperature warning icon 301 is displayed does not change but the fan starts to rotate. During the period (3), the icon display state does not change except that the second temperature warning icon 302 different from the icon displayed in the period (2) is displayed, and the fan starts to rotate. During the period (4) or (5), since the fan is rotating even in the fan AUTO mode, the rotation state of the fan does not change by switching to the fan ON mode, but the icon display state is switched to a state in which the second temperature warning icon 302 is displayed as in the period (3) (the fan icon 303 is removed). During the period (6), since the fan is rotating even in the fan AUTO mode, the rotation state of the fan does not change by switching to the fan ON mode, but the icon display state is switched to a state in which the fan icon 303 is removed and the first temperature warning icon 301 is displayed as in the period (2).

Figure 10:
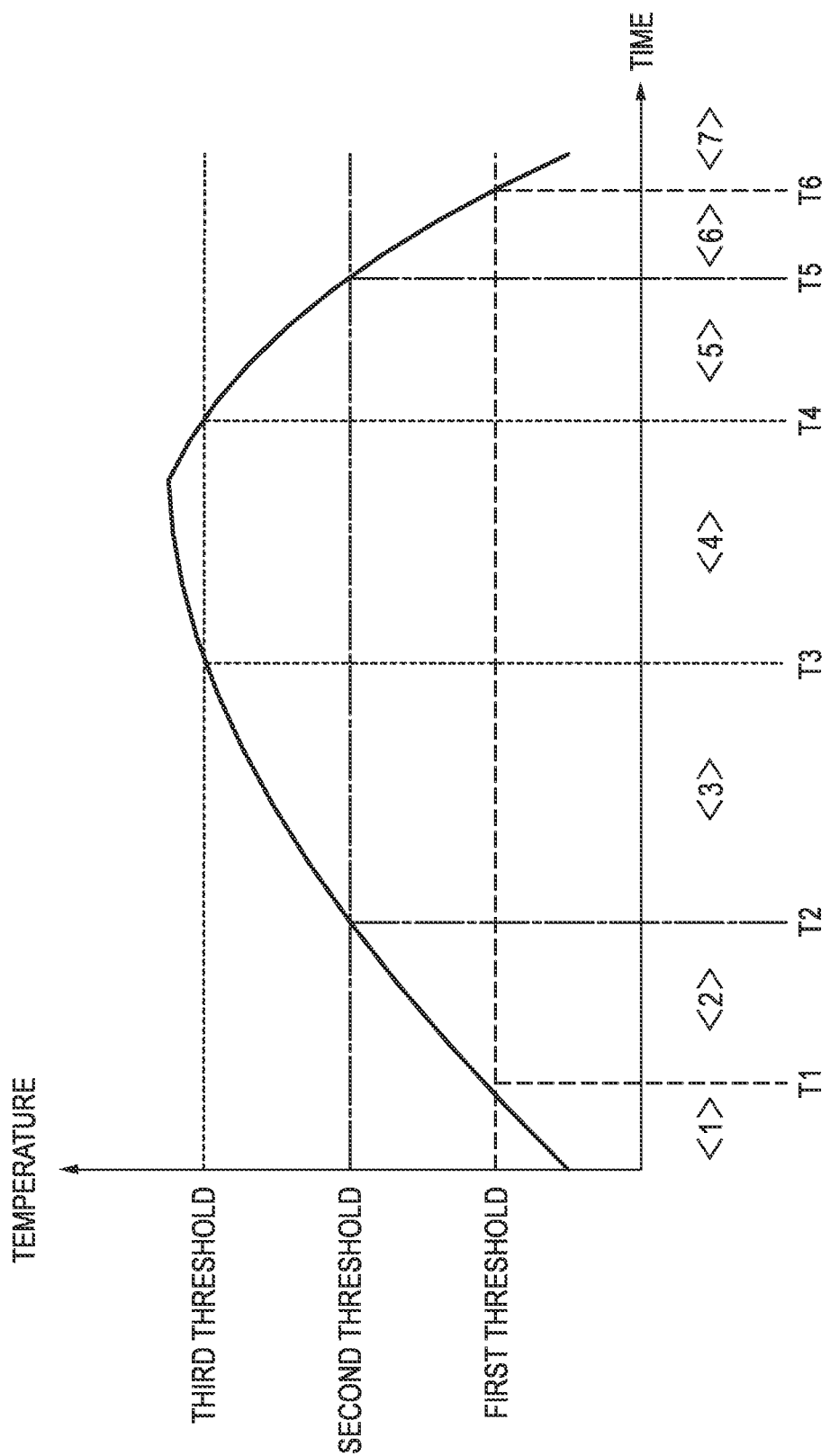
FIG. 10 is a timing chart showing the relationship between the thresholds and the internal temperature of the camera in the fan AUTO mode.

FIG. 10 is a timing chart showing variations in temperature in the fan ON mode. The ordinate represents the internal temperature of the camera, and the abscissa represents the elapsed time.

According to the aforementioned icon/fan control shown in FIG. 6, during a period <1> before a time T1, neither the temperature warning icon nor the fan icon is displayed. During a period <2> from the time T1 to a time T2, the internal temperature of the camera falls within the range from the first threshold (inclusive) to the second threshold (exclusive), and thus the first temperature warning icon 301 is displayed as shown in FIG. 3A. During a period <3> to <5> from the time T2 to a time T5, the internal temperature of the camera is equal to or higher than the second threshold, and thus the second temperature warning icon 302 is displayed as shown in FIG. 3B. During a period <6> from the time T5 to a time T6, the internal temperature of the camera falls within the range from the first threshold (inclusive) to the second threshold (exclusive), and thus the first temperature warning icon 301 is displayed as shown in FIG. 3A. During a period <7> after the time T6, neither the temperature warning icon nor the fan icon is displayed.

Figure 11:
FIG. 11 is a table showing the relationship between icon display and a fan operation in the fan AUTO mode.

FIG. 11 shows the relationship between icon display and a fan operation when the fan operation mode is switched from the fan ON mode to the fan AUTO mode during each period of FIG. 10.

If the user switches the fan operation mode from the fan ON mode to the fan AUTO mode during the period <1> shown in FIG. 10, the system control unit 201 keeps the icons in the non-display state but stops the fan because the internal temperature has not reached a temperature at which the fan rotates in the fan AUTO mode. This operation is also performed during the period <7>. Similarly, during the period <2> or <6>, the icon display state (the first temperature warning icon 301) does not change but the fan is stopped. During the period <3> or <5>, the icon display state does not change except that the second temperature warning icon 302 different from the icon displayed in the period <2> is displayed, and the fan is stopped. During the period <4>, since the internal temperature has reached the temperature at which the fan rotates in the fan AUTO mode, the system control unit 201 does not change the rotation state of the fan but switches the icon display state to that corresponding to the fan AUTO mode (the fan icon 303 is displayed).

Note that in this embodiment, a case in which the fan operation mode is switched through the fan menu has been described. However, the fan operation mode may be automatically switched depending on whether the digital video camera operates in a shooting mode or reproduction mode. That is, in the shooting mode in which noise of the fan may be recorded as the sound of a moving image being shot, the fan may operate in the fan AUTO mode. In the reproduction mode in which there is no adverse influence of noise of the fan, the fan may operate so as to prioritize cooling of the camera by switching the fan operation mode to the fan ON mode.

Even in the fan AUTO mode, in the reproduction mode in which there is no adverse influence of noise of the fan, regardless of whether the fan is rotating, the first temperature warning icon 301 may be displayed when the internal temperature falls within the range from the first threshold (inclusive) to the second threshold (exclusive), and the second temperature warning icon 302 may be displayed when the internal temperature is equal to or higher than the second threshold. That is, the first temperature warning icon 301 may be displayed during the period (6) of FIG. 8 as long as the camera is in the reproduction mode.

According to the above-described first embodiment, during a period (that is, the period (6) of FIG. 8) when the internal temperature of the camera lowers to fall within the range from the first threshold (inclusive) to the second threshold (exclusive) after the internal temperature of the camera becomes equal to or higher than the third threshold and the fan is rotated, the second temperature warning icon 302 and fan icon 303 are displayed. This display mode of the temperature warning icon is different from that during the period (2) when the internal temperature of the camera falls within the range from the first threshold (inclusive) to the second threshold (exclusive) before the fan rotates. As described above, while the fan rotates, the temperature warning icon with a warning level higher than that of the temperature warning icon displayed while the fan stands still is displayed until the camera cools to a temperature (the first threshold) at which the fan should be stopped. The reason for this will be explained.

If the fan rotates when the internal temperature becomes equal to or higher than the third threshold, and is then stopped when the internal temperature lowers below the third or second threshold, the internal temperature of the camera rises, and becomes equal to or higher than the third threshold soon, thereby rotating the fan again. Such operation frequently switches between rotation and stop of the fan, thereby causing an unstable operation. Therefore, after the internal temperature becomes equal to or higher than the third threshold to start rotation of the fan, the fan preferably continues to rotate until the camera cools enough. To do this, in this embodiment, control is performed to stop the fan when the internal temperature lowers below the first threshold so that the threshold for stopping rotation of the fan is sufficiently lower than the third threshold for starting rotation of the fan. In this case, if the first temperature warning icon 301 with a temperature warning level lower than that of the second temperature warning icon 302 is displayed during the period (6) when the internal temperature falls within the range from the first threshold (inclusive) to the second threshold (exclusive) in a cooling process in which the fan is rotating, the user may misunderstand that the fan has not stopped even though the internal temperature of the camera has lowered. To prevent such problem, in this embodiment, it is possible to make the user identify that the rotation of the fan is a normal operation by continuing to display the second temperature warning icon 302 with a higher warning level from when the fan starts to rotate until the internal temperature of the camera lowers to a fan stop temperature (the first threshold).

Figure 3D:
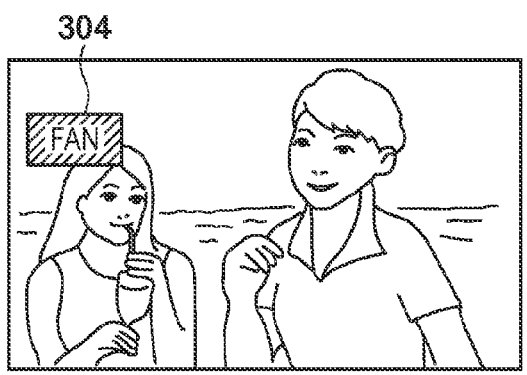

Note that a case has been described in which in the aforementioned icon/fan control in the fan AUTO mode, the second temperature warning icon 302 and fan icon 303 are displayed during a period (that is, the period (6) of FIG. 8) when the camera cools and its internal temperature falls within the range from the first threshold (inclusive) to the second threshold (exclusive) after the internal temperature of the camera becomes equal to or higher than the third threshold and the fan is rotated. If, however, such display is performed, the display mode of the temperature warning icon is different from that during the period (2) when the internal temperature of the camera falls within the range from the first threshold (inclusive) to the second threshold (exclusive) before the fan rotates, thereby confusing the user. To solve this problem, during the period (6), only the fan icon may be displayed without displaying the temperature warning icon, thereby notifying the user of a state in which the fan should rotate. FIG. 3D shows an example of display in this case. During a period (period (4) to (6)) from when the internal temperature of the camera becomes equal to or higher than the third threshold and the fan is rotated until the internal temperature of the camera lowers below the first threshold, a fan icon 304 is displayed in red, thereby indicating a state in which the internal temperature of the camera is high and thus the fan is rotating.

[Second Embodiment] In the second embodiment, a case will be described in which a fan menu for switching a fan operation mode is disabled or enabled according to the internal temperature of a camera and the operation state of a fan, in addition to icon/fan control according to the first embodiment. According to this embodiment, it is possible to provide a user interface which places importance on a cooling effect.

Figure 12:
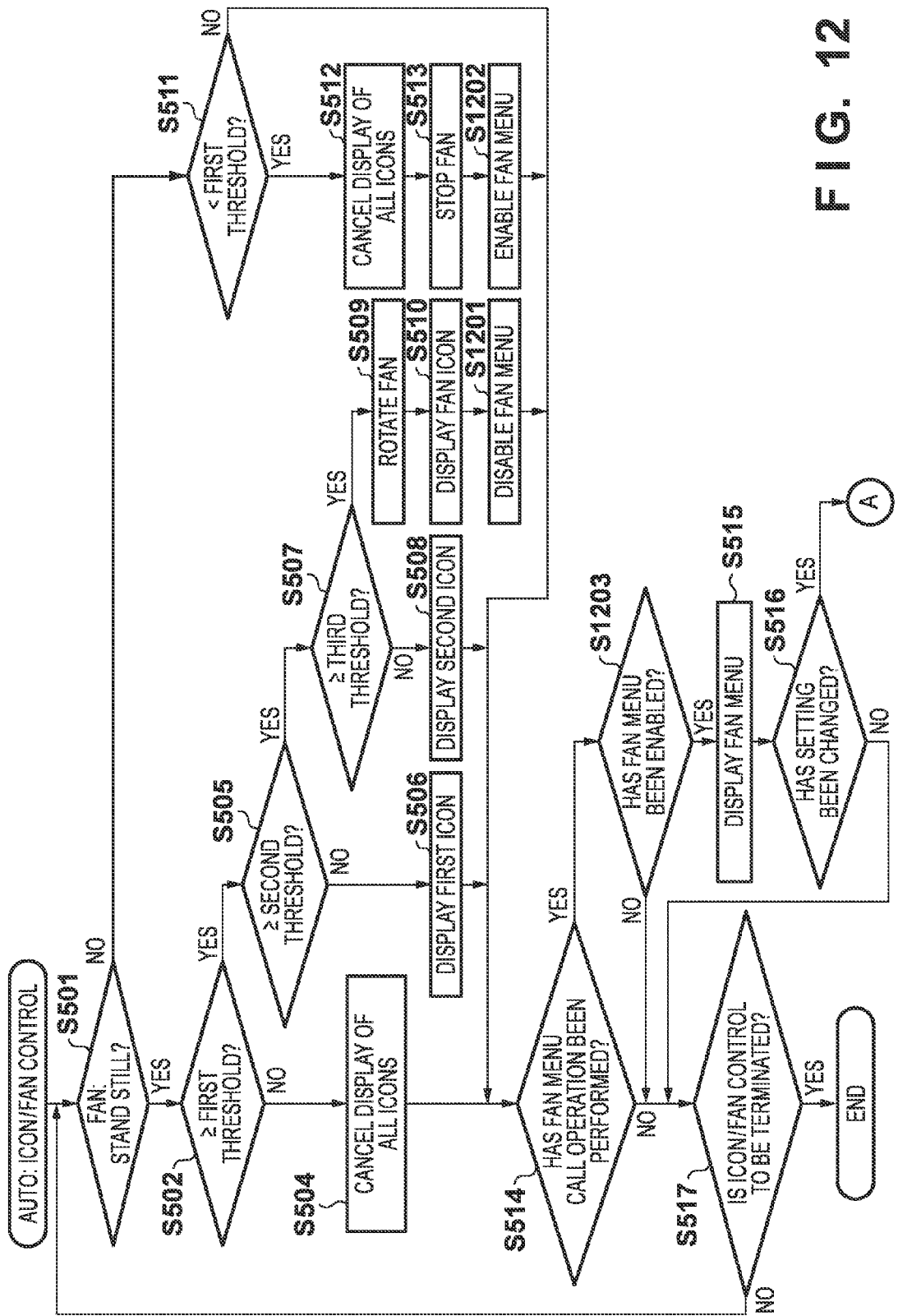
FIG. 12 is a flowchart illustrating icon/fan control in a fan AUTO mode according to the second embodiment.

FIG. 12 shows icon/fan control in a fan AUTO mode according to the second embodiment. Processes other than those in steps S1201, S1202, and S1203 are the same as those shown in FIG. 5 described above and have the same reference symbols, and a description thereof will be omitted.

In step S1201, since the internal temperature of the camera is equal to or higher than a third threshold, a system control unit 201 disables the fan menu, and records a fan menu disable flag in a system memory 212. On the other hand, in step S1202, since the internal temperature of the camera has lowered below the first threshold by the fan, the system control unit 201 enables the fan menu, and records a fan menu enable flag in the system memory 212.

If it is determined in step S514 that a fan menu call operation has been performed, the process advances to step S1203, and the system control unit 201 refers to the flag in the system memory 212 to determine whether the fan menu has been enabled. If the fan menu has been enabled, the process advances to step S515 to display the fan menu through which a fan operation mode switching operation is accepted. If the fan menu has been disabled, the process advances to step S517 to set the fan menu in a non-display state, thereby controlling not to accept a fan operation mode switching operation. That is, if the fan menu has been disabled, the user is not allowed to switch the fan operation mode.

Figure 13:
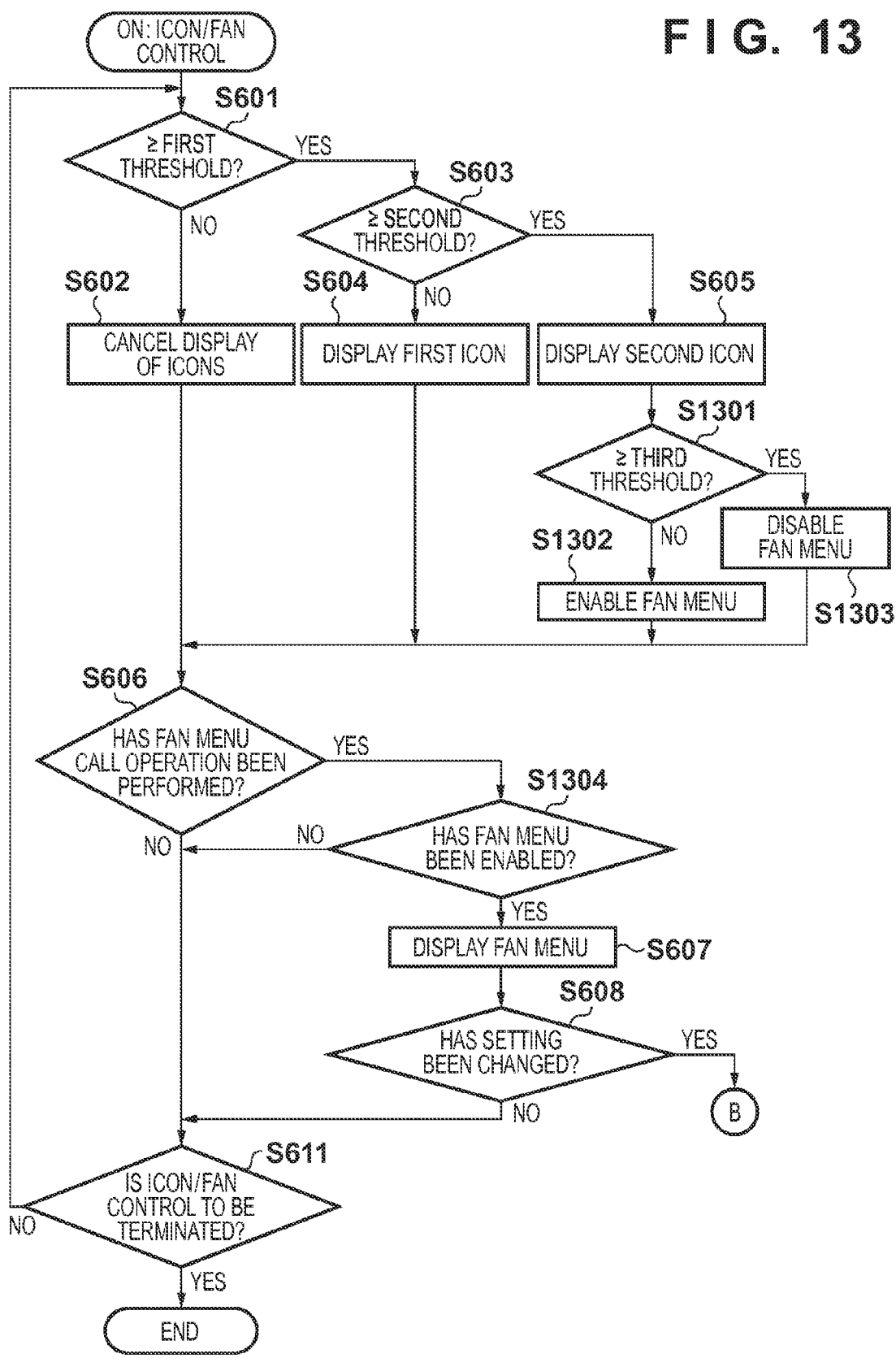
FIG. 13 is a flowchart illustrating icon/fan control in a fan ON mode according to the second embodiment.

FIG. 13 shows icon/fan control in a fan ON mode according to the second embodiment. Processes other than those in steps S1301 to S1304 are the same as those shown in FIG. 6 described above and have the same reference symbols, and a description thereof will be omitted.

If the internal temperature of the camera is equal to or higher than a second threshold, in step S1301 the system control unit 201 obtains the current internal temperature of the camera from a temperature sensor 216, and determines whether the obtained internal temperature is equal to or higher than the third threshold. If the internal temperature is equal to or higher than the third threshold, the process advances to step S1303; otherwise, the process advances to step S1302.

In step S1302, the system control unit 201 enables the fan menu, and records a fan menu enable flag in the system memory 212.

In step S1303, the system control unit 201 disables the fan menu, and records a fan menu disable flag in the system memory 212.

On the other hand, if it is determined in step S606 that a fan menu call operation has been performed, the process advances to step S1304, and the system control unit 201 refers to the flag in the system memory 212 to determine whether the fan menu has been enabled. If the fan menu has been enabled, the process advances to step S607 to display the fan menu through which a fan operation mode switching operation is accepted. If the fan menu has been disabled, the process advances to step S609 to set the fan menu in a non-display state, thereby controlling not to accept a fan operation mode switching operation. That is, if the fan menu has been disabled, the user is not allowed to switch the fan operation mode.

If the user is allowed to switch the fan operation mode from the fan AUTO mode to the fan ON mode during rotation of the fan (the fan menu is enabled), the following problem arises. If the fan operation mode is switched from the fan AUTO mode to the fan ON mode during rotation of the fan, and the fan operation mode is switched back to the fan AUTO mode, the fan is stopped when the internal temperature of the camera is lower than the third threshold. In this case, however, the fan should rotate to accelerate cooling, and stopping the fan is not preferable. In the second embodiment, switching of the fan operation mode is not allowed, thereby preventing a problem that the fan is stopped by switching the fan operation mode although the fan should rotate, and thus acceleration of cooling is interfered with.

Note that this embodiment imposes a limitation not to allow the user to change setting of the fan operation mode even in an error state in which the fan does not rotate due to some influence such as a failure.

[Third Embodiment] In the first embodiment, a case has been described in which in the fan AUTO mode, the second temperature warning icon 302 continues to be displayed from when the internal temperature of the camera becomes equal to or higher than the third embodiment to rotate the fan until the internal temperature of the camera lowers below the first threshold. In this case, however, if the internal temperature of the camera falls within the range from the first threshold (inclusive) to the second threshold (exclusive), the second temperature warning icon 302 remains displayed even though the camera cools to the extent that its internal temperature lowers below the second threshold. The user, therefore, cannot determine whether the internal temperature of the camera is lowering, and cannot confirm the cooling effect of the fan. To solve this problem, in the third embodiment, a case will be described in which a fourth threshold higher than a first threshold and lower than a second threshold is set, and a second temperature warning icon 302 is removed and only a fan icon 303 is displayed when the internal temperature of the camera lowers below the fourth threshold.

Figure 14:
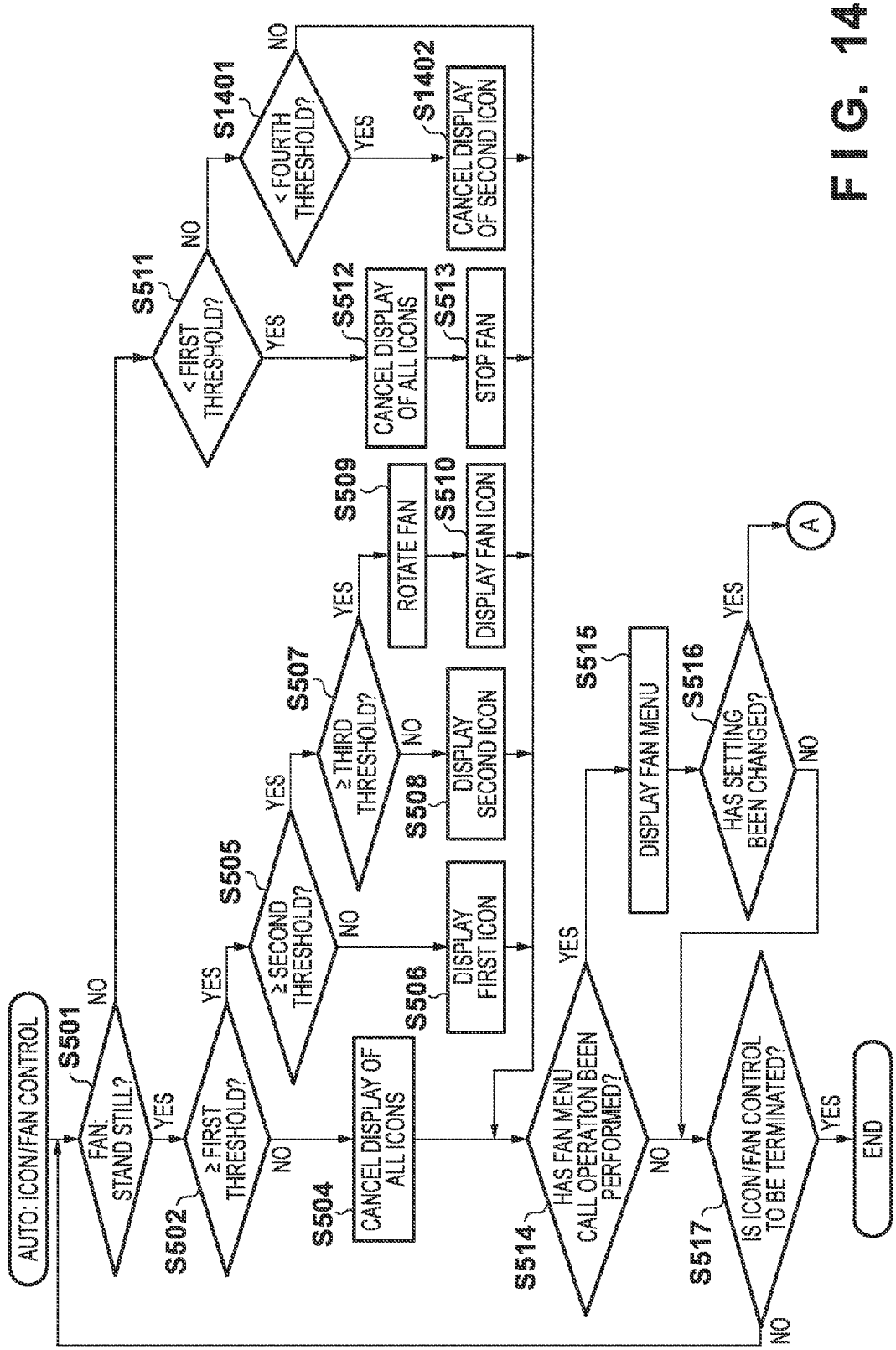
FIG. 14 is a flowchart illustrating icon/fan control in a fan AUTO mode according to the third embodiment.

FIG. 14 shows icon/fan control in a fan AUTO mode according to the third embodiment. Processes other than those in steps S1401 and S1402 are the same as those shown in FIG. 5 described above and have the same reference symbols, and a description thereof will be omitted.

During rotation of a fan (NO in step S501) before the internal temperature of a camera becomes lower than the first threshold (NO in step S511), in step S1401 a system control unit 201 obtains the current internal temperature of the camera from a temperature sensor 216, and determines whether the obtained internal temperature is lower than the fourth threshold. If the internal temperature of the camera is lower than the fourth threshold, the process advances to step S1402; otherwise, the process advances to step S514.

Figure 3E:
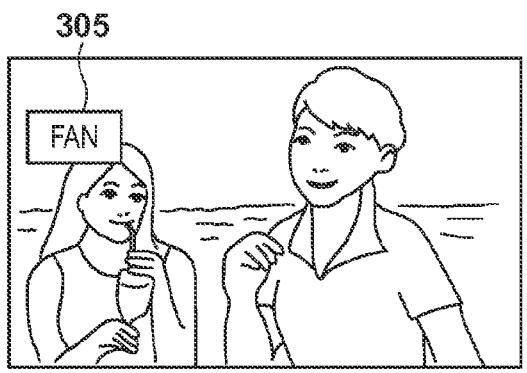

In step S1402, the system control unit 201 removes the second temperature warning icon 302, and displays only the fan icon 303. As a result, a display state shown in FIG. 3E is obtained. This operation enables the user to identify that the camera is being successfully cooled although the camera still has an internal temperature at which the fan should rotate.

Note that a single item of hardware may control the system control unit 201, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to a digital camera, the present invention is not limited to this example. The present invention is applicable to an apparatus which has a fan for cooling inside of the apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183598, filed Aug. 22, 2012, which is hereby incorporated by reference herein in its entirety.

What is claimed is:
1. A display control apparatus comprising:
a measurement unit configured to measure an internal temperature of the apparatus;
a fan configured to cool an inside of the apparatus;
a fan control unit configured to control to rotate the fan in case where the internal temperature measured by the measurement unit becomes not lower than a start threshold, and to stop the fan in case where the internal tem- perature measured by the measurement unit becomes lower than a stop threshold lower than the start threshold while the fan rotates; and a display control unit configured to control, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and control, while the fan rotates, to continue display of the second temperature information even where the internal temperature measured by the measurement unit becomes lower than the second threshold, and to set the second temperature information in a non-display state in case where the fan control unit stops the fan.

2. The apparatus according to claim 1, further comprising:
a mode switching unit configured to switch an operation mode of the fan to one of a fan ON mode in which the fan always rotates and a fan AUTO mode in which rotation of the fan is automatically controlled based on the internal temperature measured by the measurement unit,
wherein the display control unit performs display control of the temperature information in the fan AUTO mode, and displays the first temperature information in place of the second temperature information in case where the internal temperature measured by the measurement unit becomes lower than the second threshold while the fan rotates in the fan ON mode.

3. The apparatus according to claim 2, wherein
the operation mode of the fan is automatically switched to the fan AUTO mode in an image shooting mode, and to the fan ON mode in an image reproduction mode.

4. The apparatus according to claim 2, wherein
if the fan is rotating in the fan AUTO mode, switching of the operation mode of the fan is not allowed.

5. The apparatus according to claim 2, wherein
if it is determined that an error has occurred in the fan, switching of the operation mode of the fan is not allowed.

6. The apparatus according to claim 1, wherein
the temperature information is an icon for giving a temperature warning.

7. The apparatus according to claim 6, wherein
in the image reproduction mode, regardless of whether the fan is rotating, the display control unit controls to display a first temperature warning icon in case where the internal temperature is not lower than the first threshold and is lower than the second threshold, and to display a second temperature warning icon in case where the internal temperature is not lower than the second threshold.

8. The apparatus according to claim 1, wherein
in case where the internal temperature measured by the measurement unit becomes not lower than the start threshold and the fan is rotated, the display control unit displays a message for notifying that the fan has started to rotate, in addition to the fan information.

9. The apparatus according to claim 1, further comprising:
a mode switching unit configured to switch an operation mode of the fan to one of a fan ON mode in which the fan always rotates and a fan AUTO mode in which rotation of the fan is automatically controlled based on the internal temperature measured by the measurement unit,
wherein the display control unit controls to perform display control of the temperature information in the fan AUTO mode, and to display the first temperature information in place of the second temperature information in case where the internal temperature measured by the measurement unit becomes lower than the second threshold while the fan rotates in the fan ON mode.

10. The apparatus according to claim 1, further comprising:
a mode switching unit configured to switch an operation mode of the fan to one of a fan ON mode in which the fan always rotates and a fan AUTO mode in which rotation of the fan is automatically controlled based on the internal temperature measured by the measurement unit,
wherein the display control unit controls to display the first temperature information in place of the second temperature information if the operation mode is switched from the fan AUTO mode to the fan ON mode during a period when the inside of the apparatus cools and the internal temperature measured by the measurement unit becomes not lower than the first threshold and lower than the second threshold after the internal temperature becomes not lower than a third threshold and the fan is rotated.

11. The apparatus according to claim 1, wherein
the display control apparatus is an image capturing apparatus further including an image capturing unit configured to shoot a moving image.

12. A display control apparatus comprising:
a measurement unit configured to measure an internal temperature of the apparatus;
a fan configured to cool an inside of the apparatus;
a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and control to set the second temperature information in a non-display state and display fan information notifying a user of an operation of the fan in case where the internal temperature measured by the measurement unit becomes not lower than the start threshold, and not to display the first temperature information and the second temperature information regardless of the internal temperature measured by the measurement unit while the fan rotates.

13. The apparatus according to claim 12, further comprising:
a mode switching unit configured to switch an operation mode of the fan to one of a fan ON mode in which the fan always rotates and a fan AUTO mode in which rotation of the fan is automatically controlled based on the internal temperature measured by the measurement unit,
wherein the display control unit controls to set the fan information in a non-display state and to display the first temperature information if the operation mode is switched from the fan AUTO mode to the fan ON mode during a period when the inside of the apparatus cools and the internal temperature measured by the measurement unit becomes not lower than the first threshold and lower than the second threshold after the internal temperature becomes not lower than a third threshold and the fan is rotated.

14. A display control apparatus comprising:
a measurement unit configured to measure an internal temperature of the apparatus;
a fan configured to cool an inside of the apparatus;
a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and
a display control unit configured to
control, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and
control to display, together with the second temperature information, fan information notifying a user of an operation of the fan in case where the internal temperature measured by the measurement unit becomes not lower than the start threshold, and to display the fan information and set the second temperature information in a non-display state in case where the internal temperature measured by the measurement unit becomes lower than the second threshold while the fan rotates.

15. A display control method of an apparatus having a measurement unit configured to measure an internal temperature of the apparatus, and a fan configured to cool an inside of the apparatus, the method comprising:
a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and
a display control step of
controlling, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and
controlling, while the fan rotates, to continue display of the second temperature information even where the internal temperature measured by the measurement unit becomes lower than the second threshold, and to set the second temperature information in a non-display state in case where the fan is stopped in the fan control step.

16. A display control method of an apparatus having a measurement unit configured to measure an internal temperature of the apparatus, and a fan configured to cool an inside of the apparatus, the method comprising:
a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and
a display control step of
controlling, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and
controlling to set the second temperature information in a non-display state and display fan information notifying a user of an operation of the fan in case where the internal temperature measured by the measurement unit becomes not lower than the start threshold, and not to display the first temperature information and the second temperature information regardless of the internal temperature measured by the measurement unit while the fan rotates.

17. A display control method of an apparatus having a measurement unit configured to measure an internal temperature of the apparatus, and a fan configured to cool an inside of the apparatus, the method comprising:
a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and
a display control step of
controlling, while the fan does not rotate, to display first temperature information in case where the internal temperature measured by the measurement unit becomes not lower than a first threshold, and to display second temperature information in place of the first temperature information in case where the internal temperature measured by the measurement unit becomes higher than the first threshold and not lower than a second threshold higher than the stop threshold, and
controlling to display, together with the second temperature information, fan information notifying a user of an operation of the fan in case where the internal temperature measured by the measurement unit becomes not lower than the start threshold, and to display the fan information and set the second temperature information in a non-display state in case where the internal temperature measured by the measurement unit becomes lower than the second threshold while the fan rotates.

18. A display control apparatus comprising:
a measurement unit configured to measure an internal temperature of the apparatus;
a fan configured to cool an inside of the apparatus;
a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display specific temperature information in case where the internal temperature measured by the measurement unit becomes not lower than a specific threshold, and control, while the fan rotates, to continue display of the specific temperature information even where the internal temperature measured by the measurement unit becomes lower than the threshold, and to set the specific temperature information in a non-display state in case where the fan control unit stops the fan.

19. A display control method of an apparatus having a measurement unit configured to measure an internal temperature of the apparatus, and a fan configured to cool an inside of the apparatus, the method comprising:

a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display specific temperature information in case where the internal temperature measured by the measurement unit becomes not lower than a specific threshold, and controlling, while the fan rotates, to continue display of the specific temperature information even where the internal temperature measured by the measurement unit becomes lower than the threshold, and to set the specific temperature information in a non-display state in case where the fan is stopped in the fan control step.

20. A display control apparatus comprising:

a measurement unit configured to measure an internal temperature of the apparatus;

a fan configured to cool an inside of the apparatus;

a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display specific temperature information in case where the internal temperature measured by the measurement unit becomes not lower than a specific threshold, and control to set the specific temperature information in a non-display state and display fan information notifying a user of an operation of the fan in case where the internal temperature measured by the measurement unit becomes not lower than the start threshold, and not to display the specific temperature information regardless of the internal temperature measured by the measurement unit while the fan rotates.

21. A display control method of an apparatus having a measurement unit configured to measure an internal temperature of the apparatus, and a fan configured to cool an inside of the apparatus, the method comprising:

a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display specific temperature information in case where the internal temperature measured by the measurement unit becomes not lower than a specific threshold, and controlling to set the specific temperature information in a non-display state and display fan information notifying a user of an operation of the fan in case where the internal temperature measured by the measurement unit becomes not lower than the start threshold, and not to display the specific temperature information regardless of the internal temperature measured by the measurement unit while the fan rotates.

22. A display control apparatus comprising:

a measurement unit configured to measure an internal temperature of the apparatus;

a fan configured to cool an inside of the apparatus;

a fan control unit configured to control to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control unit configured to control, while the fan does not rotate, to display specific temperature information in case where the internal temperature measured by the measurement unit becomes not lower than a specific threshold, and control to display, together with the specific temperature information, fan information notifying a user of an operation of the fan in case where the internal temperature measured by the measurement unit becomes not lower than the start threshold, and to display the fan information and set the specific temperature information in a non-display state in case where the internal temperature measured by the measurement unit becomes lower than the specific threshold while the fan rotates.

23. A display control method of an apparatus having a measurement unit configured to measure an internal temperature of the apparatus, and a fan configured to cool an inside of the apparatus, the method comprising:

a fan control step of controlling to rotate the fan in case where the internal temperature measured by the measurement unit becomes not lower than a start threshold, and to stop the fan in case where the internal temperature measured by the measurement unit becomes lower than a stop threshold lower than the start threshold while the fan rotates; and a display control step of controlling, while the fan does not rotate, to display specific temperature information in case where the internal temperature measured by the measurement unit becomes not lower than a specific threshold, and controlling to display, together with the specific temperature information, fan information notifying a user of an operation of the fan in case where the internal temperature measured by the measurement unit becomes not lower than the start threshold, and to display the fan information and set the specific temperature information in a non-display state in case where the internal temperature measured by the measurement unit becomes lower than the specific threshold while the fan rotates.

24. A non-transitory computer-readable storage medium storing a program for causing a computer to execute the control method according to claim 15.

25. A non-transitory computer-readable storage medium storing a program for causing a computer to execute the control method according to claim 16.

26. A non-transitory computer-readable storage medium storing a program for causing a computer to execute the control method according to claim 17.

27. A non-transitory computer-readable storage medium storing a program for causing a computer to execute the control method according to claim 19.

28. A non-transitory computer-readable storage medium storing a program for causing a computer to execute the control method according to claim 21.

29. A non-transitory computer-readable storage medium storing a program for causing a computer to execute the control method according to claim 23.

* * * * *